United States Patent [19]
Benninger et al.

[11] 3,712,676
[45] Jan. 23, 1973

[54] SEMI-TRAILER DUMP BODY CONSTRUCTION
[75] Inventors: Arthur C. Benninger, Seneca; Meletus I. Long, Brookville, both of Pa.
[73] Assignee: Tri-Brook, Inc., Brookville, Pa.
[22] Filed: Dec. 10, 1971
[21] Appl. No.: 206,832

[52] U.S. Cl. ............................. 298/22 R, 298/17 S
[51] Int. Cl. ........................... B60p 1/04, B60p 1/28
[58] Field of Search ....... 298/22 R, 22 D, 22 B, 22 A, 298/22 P, 18, 17 S

[56] References Cited
UNITED STATES PATENTS

| 2,449,202 | 9/1948 | Day | 298/22 P |
| 2,999,721 | 9/1961 | Wood | 298/22 P |

FOREIGN PATENTS OR APPLICATIONS

| 567,690 | 12/1958 | Canada | 298/22 P |

Primary Examiner—Richard J. Johnson
Assistant Examiner—Reinhard Eisenzopf
Attorney—John M. Webb

[57] ABSTRACT

A semi-trailer dump body construction affording improved lateral stability during dumping in which a hydraulic hoist is mounted below the dump body and support frame, positioned intermediate the fifth wheel connection and the tandem rear axle assembly of the frame so as to distribute the loading more uniformly over the tandem rear wheels and including alignment means mounted on either side of the hoist to minimize lateral movement of the hoist and dump body when the hoist is in the extended dump position.

3 Claims, 7 Drawing Figures

PATENTED JAN 23 1973 3,712,676

SEMI-TRAILER DUMP BODY CONSTRUCTION

This invention relates generally to a semi-trailer dump body construction and more particularly to a semi-trailer dump body construction which greatly increases the lateral stability of a semi-trailer during dumping operations.

Semi-trailers equipped with dump bodies are often used in connection with construction work. As such, it is frequently necessary that the pay load be dumped while the semi-trailer is on unpaved and uneven terrain. Inherent with this working environment is the danger that the semi-trailer may tip or laterally capsize as the dump body is raised toward the dump position. Heretofore, the most common semi-trailer hoist construction becomes less stable as the dump body is raised.

Generally, in conventional semi-trailer dump body constructions, a hydraulically actuated, telescopic hoist is mounted at the front of the semi-trailer, above that portion of the frame which connects to the tractor's fifth wheel. The stationary end of the hoist is pivotally connected to the semi-trailer support frame above the tractor's rear wheels and the extensible end of the hoist is pivotally connected to the top portion of the dump body. The hoist of the conventional semi-trailer dump body is disposed in a chamber or closure known in the art as a "dog box," in the front portion of the body, separated by a wall from that portion of the dump body into which the pay load is carried.

Due to the location of the hoist in the conventional semi-trailer, loading is concentrated at the ends of the support frame as the hoist raises the dump body. As the dump body moves to the fully raised position, the center of gravity tends to shift toward the rear of the body. This type of weight distribution tends to bow the frame such that most of the load is carried by the rearward wheels of the tandem rear axle assembly. This leads to an unstable condition especially if the rear wheels of the tandem axle are resting on a soft spot in the ground. With the extra load on the rearward wheels, there is a greater tendency for those wheels to sink in a soft spot than if the weight were more evenly distributed over the front and rear wheels of the tandem rear axle assembly.

If the semi-trailer is resting on uneven terrain or on a soft spot during dumping, the dump body will tend to lean or tilt laterally and become, as is referred to in the art, "out of plumb." In the conventional semi-trailer dump body construction, this lateral leaning is accentuated when the hoist is in its fully extended position due to the lateral movement of the extended hoist and dump body. This additional body lean often times exceeds the stable position and is sufficient to allow the semi-trailer to overturn.

The conventional semi-trailer dump body construction with the hoist mounted at the front of the dump body requires that the hoist be enclosed in a "dog box." A portion of the pay load may stick in one of the cavities next to this hoist enclosure. This is especially a problem when the pay load is exposed to freezing temperatures. Lateral stability is decreased if the load on one side of the hoist enclosure sticks during dumping. This unbalanced weight on one side of the raised dump body is often times sufficient to cause the semi-trailer to capsize, especially if the trailer is resting on soft or uneven terrain during dumping.

Our invention eliminates many of the hazards inherent in the prior art by providing a laterally stabilized, semi-trailer dump body construction which greatly reduces the risk of overturning during dumping operations.

Our invention increases the lateral stability of a semi-trailer during dumping operations by providing a hoist construction which minimizes lateral tilting of the hoist and dump body and also provides a more uniform weight distribution on both the front and rear wheels of the tandem rear axle assembly. By providing a hoist construction which minimizes lateral tilting of the hoist and dump body, our invention maintains lateral stability of a semi-trailer especially in those situations where the terrain is uneven; and by providing a hoist construction which causes a more uniform weight distribution on the front and rear wheels of the tandem rear axle assembly, our invention improves lateral stability especially in those situations where the terrain is soft.

In accordance with our invention a semi-trailer is laterally stabilized to reduce the hazard of capsizing during dumping operations by providing a hoist which is mounted beneath the dump body and support frame rearward of the frame's fifth wheel connection and forward of the tandem rear axle assembly of the semi-trailer and including alignment means mounted on either side of the cylinder portion of the hoist positioned adjacent the extensible portion to minimize lateral movement of the hoist and dump body during dumping.

The objects of our invention will become apparent by referring to the accompanying drawings, wherein.

Figure 1:
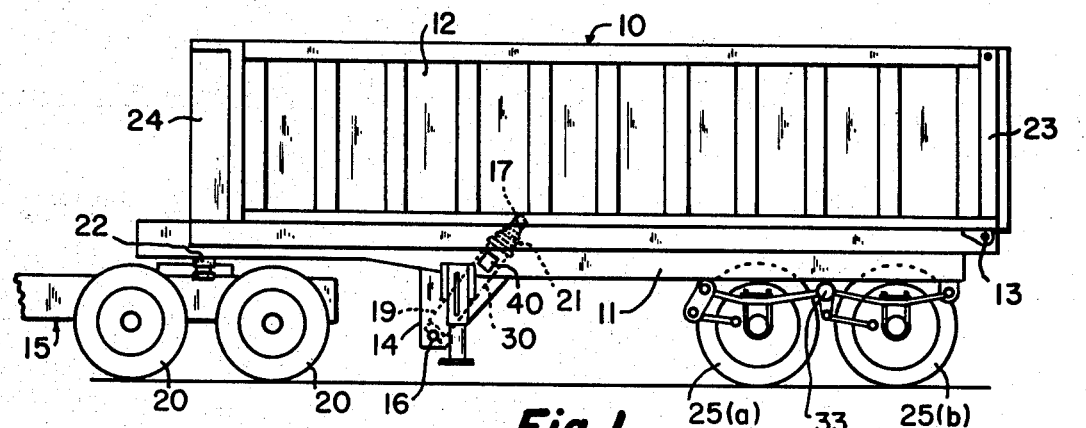
FIG. 1 is a side view of a semi-trailer structure embodying the invention, the semi-trailer being in the travel position.
Figure 2:
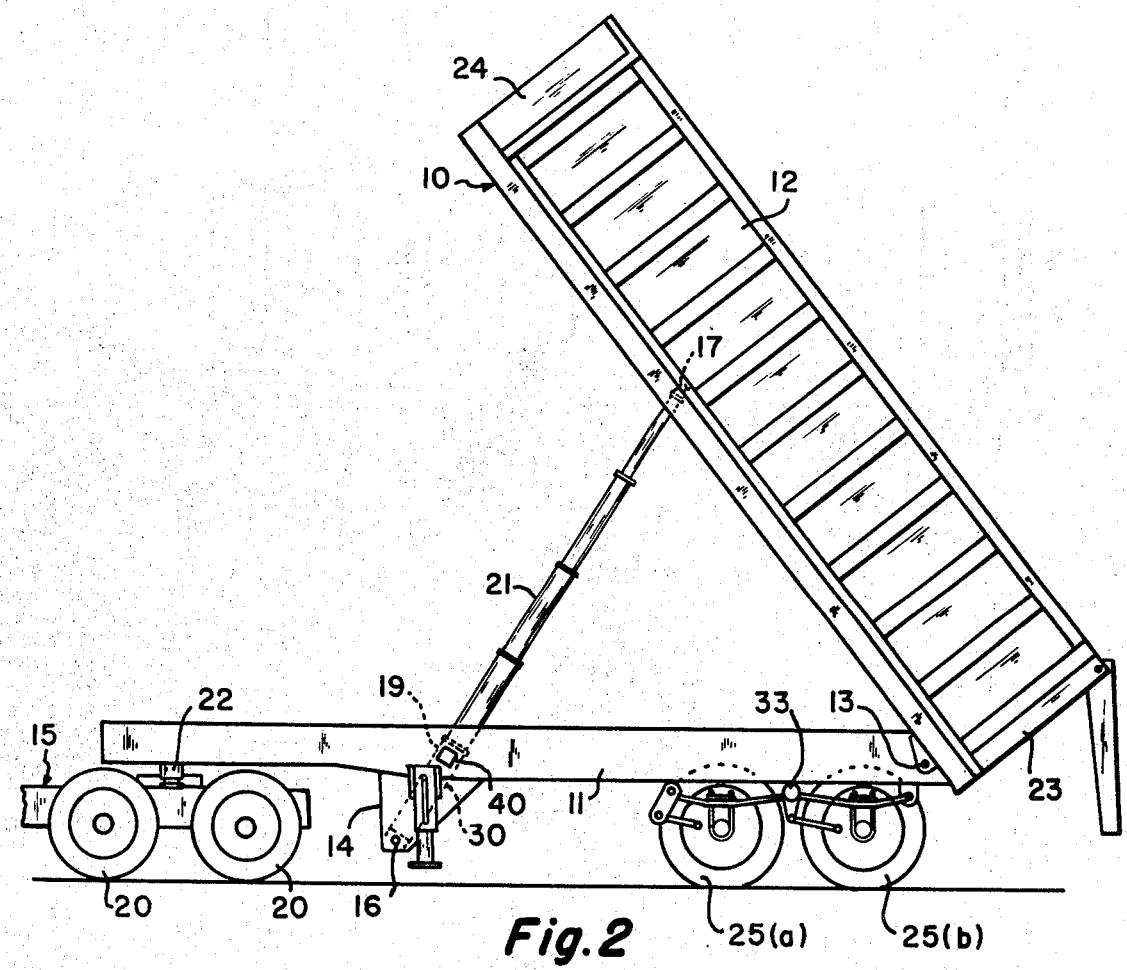
FIG. 2 is a side view of a semi-trailer structure embodying the invention with the dump body in the fully raised, dump position.

Referring now to the specific details of the drawings, wherein like parts are designated by the same numeral throughout the various FIGS., FIGS. 1 and 2 show the semi-trailer dump body construction of our invention. The semi-trailer designated generally 10 is transported by a tractor 15 which attaches to the semi-trailer's conventional fifth wheel which generally is positioned above the tractor's rear wheels 20. The semi-trailer 10 includes dump body 12 which has a forward portion 24 and a discharge or rear portion 23.

The dump body 12 is positioned on the support frame designated generally 11 and pivotally connected to the support frame 11 by pivotal connection 13 adjacent the rear portion 23 of the dump body 12. Included on the rear portion of support frame 11 is the tandem rear axle assembly 33 onto which are mounted the tandem rear wheels 25 (a) and 25 (b) which support the rear of the semi-trailer. The front portion of support frame 11 also includes fifth wheel connection means 22 positioned on the frame 11 below the forward portion 24 of the dump body 12 for detachably securing the semi-trailer to the tractor 15.

A conventional hydraulic hoist generally designated 30 is employed to tilt the dump body 12 about the pivotal connection 13. The hydraulic hoist 30 includes a stationary cylinder portion 19 and a telescoping, extensible portion 21. The hoist 30 is positioned below the dump body 12 and supported by hoist mounting means generally designated 14 which is attached to and depends below support frame 11.

Figure 3:
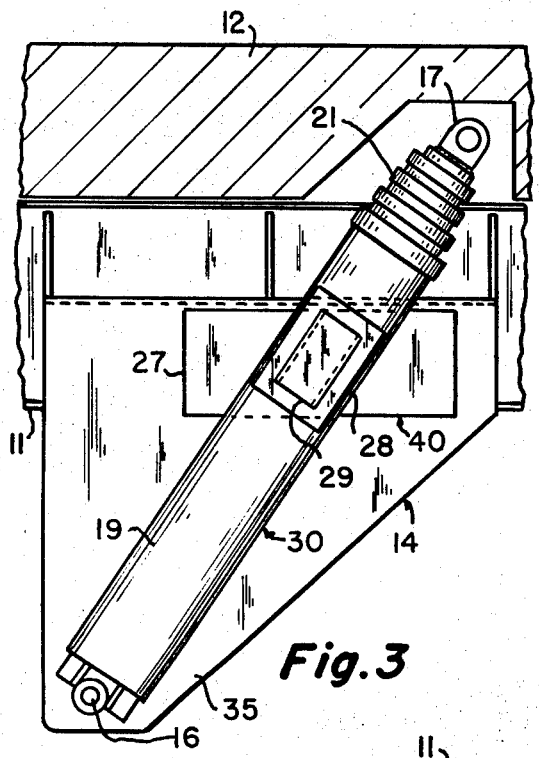
FIG. 3 is a side view of the hydraulic hoist construction showing one embodiment of the hoist alignment means.
Figure 4:
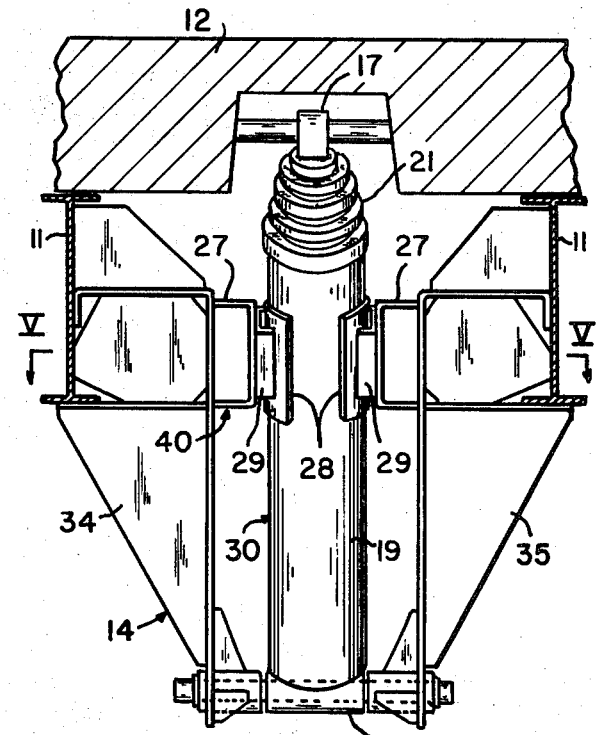
FIG. 4 is a rear view of the hoist construction and alignment means of FIG. 3.

Referring particularly to FIGS. 3 and 4, the hoist mounting means 14 includes a first mounting member 34 and a second mounting member 35. The hoist mounting members 34 and 35 are welded to the support frame 11 on either side of its longitudinal center line. Hoist mounting members 34 and 35 depend below the support frame 11 and are spaced laterally opposite each other by an appropriate distance so as to permit the mounting of the hoist 30 between them. The cylinder portion 19 of the hoist 30 is pivotally connected at one end to the hoist mounting means 14 by pivotal connection 16 and the telescoping extensible portion 21 of the hoist 30 is pivotally connected to the underside of the dump body 12 by pivotal connection 17. As can be seen in FIGS. 1, 2 and 3, the hydraulic hoist 30 is mounted at an angle such that the pivotal connection 17 of the extensible portion is rearward that of pivotal connection 16 of the cylinder portion. Such a mounting construction is desirable since it provides a minimum of pivotal movement of the hoist during the dumping operation and hence, closer lateral alignment can be achieved.

The hoist 30 is longitudinally positioned on the support frame 11 rearward of the fifth wheel connection means 22 and forward of the tandem rear axle assembly 33 of the semi-trailer. By positioning the hoist 30 between the fifth wheel connection means 22 and the tandem rear axle assembly 33, the lateral stability of the semi-trailer 10 is increased during operations. As can be seen in FIG. 2, when the dump body 12 is in the raised dump position, the loading is concentrated on the support frame 11 at the rear pivotal connection 13 and at the hoist pivotal connection 16. The load applied at the hoist pivotal connection 16 is transmitted by the hoist mounting means 14 to the support frame 11 which forces that section of the frame intermediate the fifth wheel connection means 22 and the tandem rear axle assembly 33 toward the ground. When the frame 11 is loaded rearward the fifth wheel connection means 22, a greater portion of the load is transmitted to the forward wheels 25 (a) of the tandem rear axle assembly 33. At the same time during dumping, the rear wheels 25 (b) of the tandem rear axle assembly 33 are being loaded by the weight concentrated at the rear pivotal connection 13. When weight is distributed more uniformly over the forward and rear wheels of the tandem rear axle assembly in this manner, the semi-trailer becomes more stable especially on soft terrain.

Figure 5:
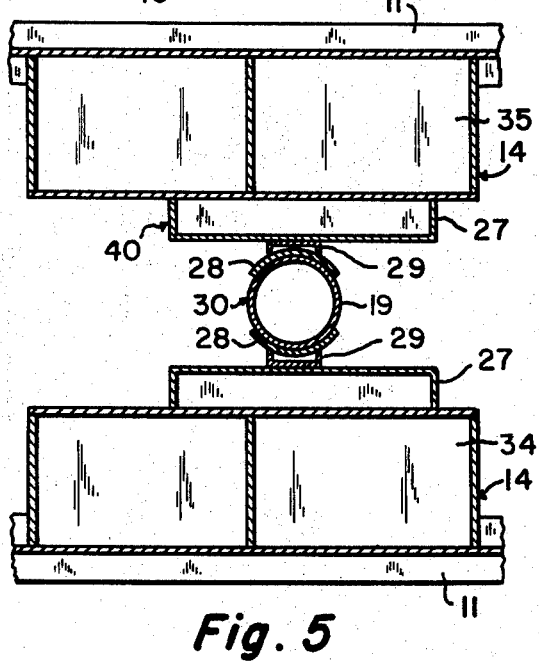
FIG. 5 is a sectional view taken along line V—V of FIG. 4.

The lateral stability of a semi-trailer is likewise improved when lateral tilting of the extended hoist and dump body is minimized. Referring now to FIGS. 3–7, the hoist alignment means 40 can best be seen. One embodiment of the hoist alignment means 40 is shown in FIGS. 3, 4, and 5. A pair of reinforcing plates 28 with surfaces formed to match the curvature of the hoist 30 are attached to the cylinder portion 19 of the hoist 30 and positioned on opposite sides of the cylinder portion 19 adjacent the extensible portion 21 of the hoist. A pair of wear plates 29 each having a flat surface are attached to the reinforcing plates 28 on either side of the cylinder portion 19 of the hoist 30. A pair of guide rails 27 are attached to mounting members 34 and 35 of the hoist mounting means 14 on either side of the hoist 30 as best seen in FIGS. 4 and 5. The guide rails 27 extend from hoist mounting members 34 and 35 and slidably abut the wear plates 29. This alignment structure allows transverse movement of the hoist 30 about pivotal connection 16 of the cylinder portion 19 but does not permit movement of the hoist 30 in the lateral direction.

Figure 6:
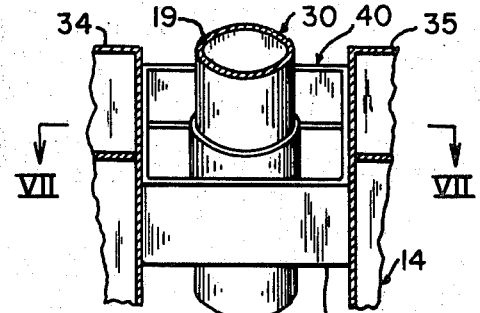
FIG. 6 is a partial, front view of the hoist showing another embodiment of the hoist alignment means.
Figure 7:
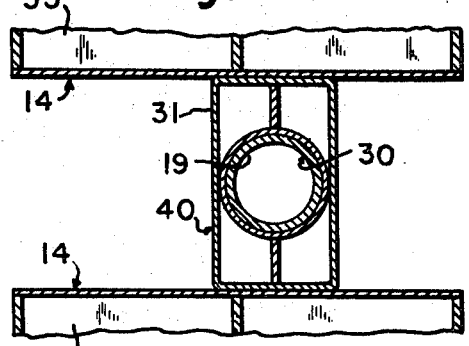
FIG. 7 is a partial, sectional view taken along line VII—VII of FIG. 6.

Lateral movement of the hoist 30 and the dump body 12 is similarly minimized by another embodiment of the hoist alignment means 40 shown in FIGS. 6 and 7. Guide channel 31 is attached to the cylinder portion 19 of the hoist 30 adjacent the extensible portion 21. Guide channel 31 extends outwardly on opposite sides of the hoist 30 and slidably abuts the sides of the hoist mounting members 34 and 35. This alignment structure allows transverse movement of the hoist 30 about pivotal connection 16 of cylinder portion 19 but does not permit movement of hoist 30 in the lateral direction.

While the preferred embodiments of the present invention have been shown and described herein, it is obvious that many structural details may be changed without departing from the spirit and scope of the appended claims.

What is claimed is:

1. A semi-trailer dump body construction affording improved lateral stability during dumping, which comprises:

a. a semi-trailer dump body having a front portion and a rear portion;

b. a semi-trailer support frame having a front portion and a rear portion and including therewith fifth wheel connection means located adjacent the front portion for attaching the semi-trailer to the fifth wheel of a tractor and also including a rear axle assembly mounted adjacent the rear portion of said support frame;

c. dump body mounting means for pivotally connecting said body to said support frame positioned adjacent the rear portions of said body and said support frame;

d. hydraulic hoist means for tilting said body about said dump body mounting means, said hoist means having a cylinder portion and an extensible portion;

e. hoist mounting means for securing the hydraulic hoist below the dump body, said mounting means attached to and depending below the support frame and longitudinally positioned between the fifth wheel connection means and the rear axle assembly of the support frame;

f. means pivotally connecting the extensible portion of the hydraulic hoist to the dump body;

g. means pivotally connecting the cylinder portion of the hydraulic hoist to the hoist mounting means, below the support frame, said pivotal connection means positioned forward of the pivotal connection means of the extensible portion so as to minimize pivotal movement of the hoist about the pivotal connection means of the cylinder portion during dumping operations;

h. hoist alignment means positioned at the cylinder portion of the hoist adjacent the extensible portion thereof, said alignment means positioned on opposite sides of said hoist between the cylinder portion and the hoist mounting means to slidably align the cylinder portion so as to permit movement of the hoist about the pivotal connection means of the cylinder portion and to prohibit movement of the hoist in the lateral direction during dumping operations.

2. The semi-trailer dump body construction of claim 1, wherein the hoist alignment includes:

a. a pair of reinforcing plates each having a curved shape matching the curvature of the cylinder portion of the hoist, said pair of reinforcing plates attached on opposite sides of the cylinder portion adjacent the extensible portion of the hoist;

b. a pair of wear plates each having a flat surface attached to the reinforcing plates on opposite sides of the cylinder portion adjacent the extensible portion of the hoist;

c. a pair of guide rails attached to the hoist mounting means on either side of the cylinder portion, said guide rails extending from the hoist mounting means and slidably abutting the wear plates on opposite sides of the hoist so as to allow transverse movement of the hoist about the pivotal connection means of the cylinder portion and to prohibit movement of the hoist in the lateral direction.

3. The semi-trailer dump body construction of claim 1, wherein the hoist alignment means includes a guide channel attached to the cylinder portion of the hoist adjacent the extensible portion, said channel extending outwardly on opposite sides from the cylinder portion and slidably abutting the sides of the hoist mounting means so as to allow transverse movement of the hoist about the pivotal connection means of the cylinder portion and to prohibit movement of the hoist in the lateral direction.

* * * * *